United States Patent
Krumme et al.

(10) Patent No.: US 8,519,721 B2
(45) Date of Patent: Aug. 27, 2013

(54) METHOD FOR COMPENSATION OF SYSTEM TOLERANCES IN INDUCTIVE COUPLERS

(75) Inventors: Nils Krumme, Feldafing (DE); Arno Zimpfer, Mammendorf (DE); Stefan Fischer, Fuerstenfeldbruck (DE)

(73) Assignee: Schleifring und Apparatebau GmbH, Fuerstenfeldbruck (DE)

( * ) Notice: Subject to any disclaimer, the term of this patent is extended or adjusted under 35 U.S.C. 154(b) by 357 days.

(21) Appl. No.: 13/044,845

(22) Filed: Mar. 10, 2011

(65) Prior Publication Data
US 2011/0248727 A1     Oct. 13, 2011

(30) Foreign Application Priority Data
Mar. 10, 2010 (DE) .......................... 10 2010 015 906

(51) Int. Cl.
*G01R 27/28* (2006.01)
*H05G 1/10* (2006.01)
(52) U.S. Cl.
USPC ............................ 324/652; 324/655; 378/101
(58) Field of Classification Search
USPC .................................. 324/652, 655; 378/101
See application file for complete search history.

(56) References Cited

U.S. PATENT DOCUMENTS

| 7,054,111 | B2 | 5/2006 | Dominguez, Jr. et al. |
| 7,197,113 | B1 | 3/2007 | Katcha et al. |
| 7,634,046 | B2 * | 12/2009 | Krumme .......................... 378/19 |
| 8,164,929 | B2 * | 4/2012 | Zimpfer .......................... 363/34 |

* cited by examiner

*Primary Examiner* — Amy He
(74) *Attorney, Agent, or Firm* — Kevin L. Daffer; Daffer McDaniel LLP

(57) ABSTRACT

A method is disclosed for compensation of system tolerances in an inductive coupler which includes a power generator that feeds an alternating current into a series resonance circuit formed by a resonance capacitor and an inductive rotating transmission device. First, a brief sequence of at least one period of an alternating current is fed by the power generator into the series resonance circuit. Then the series resonance circuit is short-circuited. A first resonance frequency is measured. Then a longer sequence having a plurality of periods of an alternating-current voltage is generated by the power generator, so that a given small voltage is built up at the load. Now a second resonance frequency is measured while the resonance circuit is short-circuited. Then at least one correcting variable for the power generator is determined from the two resonance frequencies.

20 Claims, 6 Drawing Sheets

METHOD FOR COMPENSATION OF SYSTEM TOLERANCES IN INDUCTIVE COUPLERS

PRIORITY CLAIM

The present application claims priority to pending German Patent Application No. 102010015906.9 filed Mar. 10, 2010

BACKGROUND OF THE INVENTION

1. Field of the Invention

The invention relates to inductive couplers for non-contacting power transmission, particularly for computer tomographs. With these, electric power mainly needed for operating an X-ray tube is transmitted from a stationary side to a rotating side of a gantry of a computer tomograph. Here the transmission is effected without contact by means of an inductive rotary joint that is built up similarly to a transformer in which the primary side and the stationary side are rotatable with respect to each other.

2. Description of Relevant Art

With units that are movable relative to each other, such as radar installations or also computer tomographs, similarly as in the case of linearly movable units such as crane installations or conveyor vehicles, it is frequently necessary to transmit electrical energy between movable units. In order to transmit this energy without contact, inductive couplers are preferably used. These have the advantage over mechanical slide tracks or also slip rings that abrasion, wear, mechanical effort for moving the coupler, and also the maintenance effort is substantially less. The term "inductive coupler" here refers to a circuit for generating an alternating-current voltage and an inductive transmission device or rotary joint for energy transmission between two parts that are rotatable relative to each other, and in particular to rotatable parts.

As disclosed in U.S. Pat. No. 7,197,113, for example, inductive rotating transmission devices have magnetic cores of iron or ferrite material and at least one winding on each side of units that are rotatable relative to each other. An alternating current is fed into a first winding and tapped off via a second winding that is movable relative thereto.

U.S. Pat. No. 7,054,111 shows a complete circuit of an inductive power transmission system for computer tomographs, including the associated power electronics.

With conductively coupled slip rings it is simple to transmit a predetermined voltage from a stator side to a rotor side. Here only the relatively small ohmic losses must be taken into account. With inductive rotary transmission devices, the stray inductance of a rotary transmission device plays a substantial part. It represents a frequency-dependent impedance that substantially affects the transmission properties of the rotating transmission device. This stray inductance depends upon various factors such as the inductance of the windings of a stator side and a rotor side, and also upon the magnetic structure. Now, in order to transmit electrical energy through a rotating transmission device of this kind, a series capacitance is connected in series for compensation. With this, a series resonance circuit results. This has an impedance of zero at its resonance frequency and allows for a transmission of large power. For control of the power flow, the operating frequency can be chosen to differ from the resonance frequency.

Instead of a series resonance circuit, a parallel resonance circuit also can be built-up by connecting a capacitance in parallel. The properties described in the following apply similarly to a parallel resonance circuit. At its resonance frequency the resonance circuit has an impedance of almost zero and here allows for a transmission of large power. The output voltage can be controlled by changing the impedance, which is performed by changing the switching frequency.

The inductances in a resonance circuit represent frequency-dependent impedances that substantially affect the transmission properties of the rotating transmission device. These inductances depend upon various factors such as the structure and the permeability of the magnetic circuit, the structure of the winding and, in particular, the airgap between the stator side and the rotor side. These factors are not constant in series fabrication, but are subject to particular tolerances. Various measures are known for maintaining the output voltage on the rotating side within acceptable limits for all values, occurring in the series, of the significantly involved component parts concerned—in particular the resonance capacitor, the matching transformer, and the inductive rotating transmission device. One possibility is to measure the output voltage and to feed back this output value to the stationary side. For this, however, a rotating transmission device is needed, which causes additional cost and requires space.

Another possibility is to build-in additionally a converter stage, mostly a DC-DC converter, on the rotating side between the secondary side of the rotating transformer and the output. In these converter stages frequently buck or boost converters are used, but other converters such as Zeta or Cuk converters are also possible. The input voltage of this downstream connected converter stage may fluctuate within a wide range, with the output voltage being kept constant. This solution, however, needs an additional converter on the rotating side, which increases cost and also weight and volume of the arrangement.

SUMMARY OF THE INVENTION

The embodiments are based on the object of designing an inductive coupler, in particular an inductive rotating transmission device, in such manner that the output voltage can be maintained nearly constant independently from mechanical and electrical tolerances of the electrical component parts, by use of a primary side control. Another aspect of the invention is a method for maintaining the output voltage of an inductive coupler constant independently from mechanical and electrical tolerances of the electrical component parts. Furthermore, according to the invention no rotating transmission device for transmitting feedback or control signals from the secondary side to the primary side for transmission of measured values of the output voltage on the secondary side shall be necessary.

This object is achieved with a device according to the independent claim. Advantageous further developments are set out in the dependent claims.

The method is applied to an inductive coupling means, preferably an inductive rotating transmission device. The inductive coupling means includes a power generator for generating a pulsed direct current or an alternating current. Furthermore, it includes an inductive power transmission means in which the primary side and the secondary side are movable relative to each other. This power transmission means has a primary side with at least one primary winding, and a secondary side with at least one secondary winding. Furthermore, a capacitance, preferably in the form of a resonance capacitor, is inserted in series with the primary winding, so that a series resonance circuit results. For power transmission, the pulsed direct-current voltage or alternating-current voltage of the power generator is fed into this series resonance circuit, so that an alternating magnetic field arises in the primary winding. This in turn induces in the secondary winding a current that is fed into a load. For better coupling between primary winding and secondary winding, component parts having soft magnetic materials, preferably iron or ferrite components, are provided. Optionally a matching transformer can be provided. For controlling the method preferably a control means is provided.

The method includes 3 sections, each of which can be subdivided into several steps. The first two sections relate to different measurements of resonance frequencies, while the third section relates to the evaluation of the measurement results. The order in which the first two sections are performed may be changed without the basic outlines of the method being altered thereby.

In the first section the power generator feeds a short sequence of at least one pulse of a direct current, or of at least one period of an alternating current, into the resonance circuit. In the next step the series resonance circuit is short-circuited. Thereby it is caused to oscillate at a first resonance frequency. In a third step this resonance frequency is measured.

In a second section the power generator generates a longer sequence having several pulses of a direct-current voltage, or several periods of an alternating-current voltage. This longer sequence causes a definite amount of energy to be passed to the secondary side on which a suitable charging capacitor, located to follow a rectifier circuit, is charged. The charging capacitor is preferably charged at a voltage less than the rated voltage, so that the circuit is not yet activated at the load that may be, for example, an X-ray source. Following this in turn, the series resonance circuit is short-circuited. In the next step a second resonance frequency is measured. This second resonance frequency is now determined by other components than is the first resonance frequency. The charging of the charging capacitor now causes the rectifier diodes to be polarized in the non-conducting direction as long as the series resonance circuit has an only small oscillation amplitude. Thereby the current circuit with the load is decoupled from the remainder of the circuit.

Now in a third section the determination of at least one value of a control parameter for controlling the primary side is performed, by which the output voltage can be set. This can be performed by calculation, estimation, or reading-out a table of values. Preferably the operating frequency of the power generator is determined as a control parameter. Alternatively or additionally, also an input voltage for the power generator (an intermediate circuit voltage) can be set, such as is generated for example by an upstream converter or a power factor correction circuit. Basically, also a correction parameter for an internal correcting variable of a regulating circuit can be used instead of the control parameter. Thus, in particular for example, a predetermined value for a generator frequency or an output voltage can be corrected with the correction parameter.

As now two different measurements have been performed with different frequencies in the first and second sections, in which different components of the power transmission device were involved, the inductance of the primary side of the power transmission device and/or also the stray inductance of the power transmission device now can be calculated, in case the remaining values for the components, such as for example the capacitance of the resonance capacitor and, as the case may be, the inductances of the matching transformer, are either known or defined as constant values. With this inductance it is now possible to find an optimum operating point or an optimum operating frequency of the power generator for transmission of a given power or for attainment of a well-founded output voltage or an output current on the output side.

In order to generate the table of values or a formula for calculating the control parameter, a multi-dimensional table of values can be recorded for reference during a calibration phase. This is effected by intentional variation of parameters such as, for example, the air-gap and resonance capacitance with which resonance frequencies for both measurements are set. By adjusting the air-gap, the resonance frequency obtained for the measurement according to section 2 is varied, and by varying the resonance capacitance or stray inductance, the resonance frequency obtained for the measurement according to section 1 is varied. For each measured frequency pair, the value for the control parameter is determined, which value is needed for setting the output voltage to the desired value. The described method can now be applied for various positions between the movable parts of the power transmission device, in particular for different angular positions of the rotating transmission device. Thus, in the case of a rotating transmission device it is possible to determine a function of the inductance, or the optimum operating frequency, in dependence upon the angular position. In an advantageous manner, during initial operation of a computer tomograph an initializing or measuring sequence is performed, in which the method is performed in dependence upon angular position for at least one revolution of the rotating part of the gantry of the computer tomograph.

For verification of a measurement, or for increasing the accuracy of the measurement, advantageously a plurality of measurements can be performed successively. Each of the measured frequencies can be checked for plausibility. Thus, erroneous measurements can be screened-out. The precision of an overall measurement can be increased by determination of the arithmetic mean value.

Appropriately, the measured values will be expected to lie within a previously stipulated range. This admissible range is derived from the maximum tolerances. If now the measured values from one of the two methods of measurement lie outside this admissible range, then this can lead to a malfunction of the instrument, for example to too high or too low an output voltage that by itself is not directly measured. With the described method this malfunction can be detected and an error signal issued. Consequently the instrument then can be switched-off and, for example, a suitable service warning signal given. In this manner, inadmissibly high tolerances of the mechanical or electrical component parts are detected. These tolerances may vary, for example during the lifetime, during operation outside the range laid down in a specification, or with material faults, and may become larger than admissible limiting values.

In another embodiment, an auxiliary generator is used instead of the power generator for generating the sequences of at least one pulse of a direct-current voltage, or one period of an alternating-current voltage. This auxiliary generator, in comparison with the generator that can feed the load of the X-ray tube, need supply only comparatively low power and can be correspondingly simply dimensioned. Furthermore, a suitable auxiliary switch can be provided for short-circuiting the series resonance circuit.

Advantageously, the measurements can be performed also under load. Optionally the history of the load conditions can be evaluated in order to determine a suitable point of time for a measurement. During operation, or at short intervals in which no X-ray radiation is issued, effects of the operation such as, for example, thermal expansion owing to temperature increase, can be detected and thus compensated.

The method is applicable also for inductive rotating transmission devices having a plurality of primary windings and/or a plurality of secondary windings.

A further embodiment is an inductive coupler means having a control means for performing the above-described method.

Another embodiment is a computer tomograph having an above-described inductive coupler means.

For the sake of clarity of representation, the explanations given in this document relate to inductive rotating transmission devices for energy transmission between units that are rotatable relative to each other. However, it is evident to a person skilled in the art that the same principles can be applied also to non-contacting energy transmission between units moving arbitrarily relative to each other, in particular to linearly movable units. For this, merely an adaptation of the geometry of the rotating transmission device to the track and the kind of movement must be performed. Here the method of measurement of the invention can be applied just as advantageously.

BRIEF DESCRIPTION OF THE DRAWINGS

In the following the invention will be described by way of example, without limitation of the general inventive concept, on examples of embodiment and with reference to the drawings.

Figure 1:
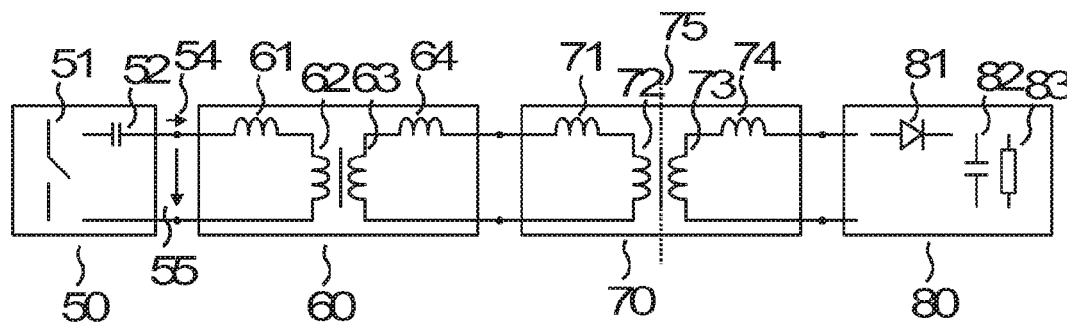
FIG. 1 schematically shows the equivalent circuit diagram of an inductive rotating transmission device according to the invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

In FIG. 1 the equivalent circuit diagram of an inductive rotating transmission device according to a first embodiment is schematically shown. The power generator 50 includes a power switch 51 for generating a pulsed direct-current voltage or an alternating-current voltage from a here not shown direct-current input voltage. This switch can be, for example, a half-bridge or also a full bridge. Preferably, here power transistors such as FETs or IGBTs are used. At the output of the switch is located a resonance capacitor 52 that forms a resonance circuit together with the further inductances of the circuit. The power generator 50 supplies an output current 54 at an output voltage 55 to the matching transformer 60. This is shown again by means of a equivalent circuit diagram. It includes the first parallel inductance 62 and the second parallel inductance 63, both magnetically coupled with each other, and also the first series inductance 61 and the second series inductance 64. This matching transformer serves to match the impedance or the voltage level of the power generator to the downstream inductive rotating transmission device 70 or the load circuit 80. The inductive rotating transmission device 70 is here also represented by a equivalent circuit diagram. The transmission device itself includes a primary inductance (first parallel inductance) 72 and a secondary inductance (second parallel inductance) 73. Both of these are separated from each other by the here schematically represented rotation gap 75, i.e. an air-gap between rotor and stator. Here too, the first series inductance 71 and the second series inductance 74 are present. The load circuit 80 is connected on the rotor side of the rotating transmission device. It includes a rectifier 81 and also a charging capacitor 82 and a load, here symbolized by a load resistor 83. The rectifier 81 may be a one-way rectifier in accordance with prior art, a bridge rectifier, or preferably also a synchronous rectifier. The circuit shown here is a preferred example of embodiment. An inductive rotating transmission device according to an embodiment, or a method of an embodiment, also operates without a matching transformer 60. This is not absolutely necessary, however it considerably increases flexibility during the dimensioning of the entire arrangement. Moreover, with it a further separation of potential can be achieved. Furthermore, the resonance capacitor 52 may be disposed also at other places of the circuit, so that a series resonance circuit results.

The method disclosed herein includes three sections, each of which can be subdivided into several steps: a, b, c, d, e, f, g. The first two sections relate to different measurements of resonance frequencies, whilst the third section relates to the evaluation of the measurement results. The order in which the first two sections are performed may be changed without the basic outlines of the method being altered thereby. This results in a step sequence of d, e, f, a, b, c, g.

The first section has these steps: a) generating a brief sequence of at least one pulse of a direct-current voltage or one period of an alternating-current voltage; b) short-circuiting the series resonance circuit; and c) measuring the frequency of oscillation resulting in the series resonance circuit at a first frequency.

In this first section the power generator feeds a short sequence of at least one pulse of a direct current, or of at least one period of an alternating current, into the resonance circuit. Preferably the sequence comprises less than 10 and most preferably one pulse or period. In the next step the series resonance circuit is short-circuited. Thereby it is caused to oscillate at a first resonance frequency. In a third step this resonance frequency is measured. This first resonance frequency is determined by the resonance capacitor and also by the inductances that are active in this series resonance. According to the equivalent circuit diagram of FIG. 2, these are predominantly the first series inductance and the second series inductance of the inductive rotating transmission device. In case a matching transformer is connected between the power generator and the inductive power transmission device, the first series inductance and the second series inductance thereof also affect the resonance frequency.

Figure 2:
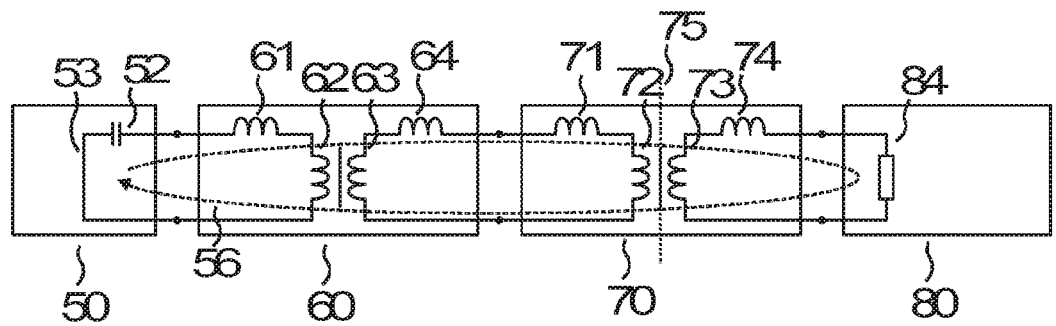
FIG. 2 shows the path of current in the circuit during the first measurement operation.
Figure 4:
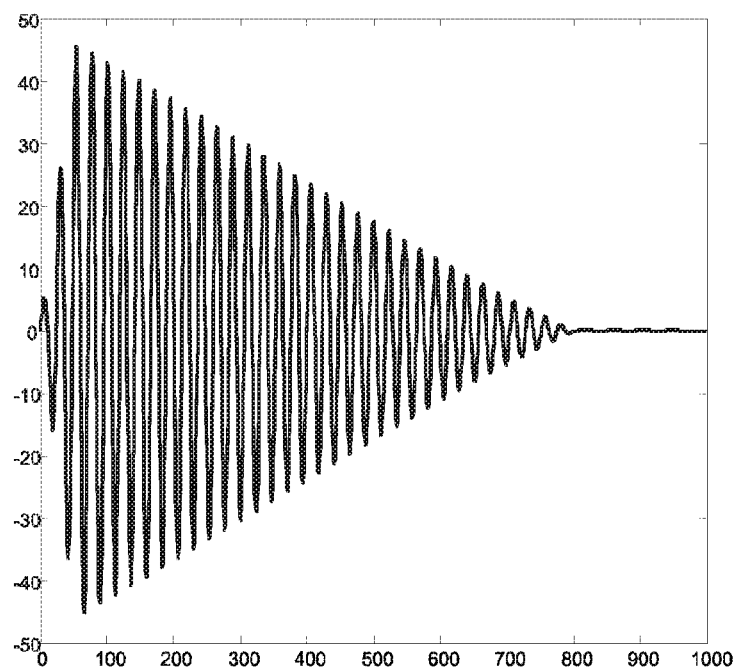
FIG. 4 shows the temporal path of the output current of the power generator during the first measurement operation.

FIG. 2 shows the first measurement operation of an embodiment. By means of the power switch 51 a brief current or voltage pulse or also a brief pulse sequence is issued into the circuit via the resonance capacitor 52. Then the output of the power switch is short-circuited with the power switch or an auxiliary switch, so that the resonance circuit itself can oscillate at its natural frequency. Here a series resonance circuit results from the resonance capacitor 52 and the series inductances 61, 64, 71 and 74, which feeds the load resistance 84. Usually this load resistance does not correspond to the load resistance 83 at rated load through the X-ray tube, because the X-ray tube cannot yet be set into operation by the low transmitted energy. This load resistance results because the rectifier 81 introduces a current into the charging capacitor 82 that is charged thereby. The energy needed to charge the charging capacitor is drawn from the resonance circuit. Here a decaying oscillation at a first resonance frequency results, as is illustrated in FIG. 4.

The second section has these steps: d) generating a longer sequence with a plurality of pulses of a direct-current voltage or a plurality of periods of an alternating-current voltage, so that a given small voltage is built-up at the load (12); e) short-circuiting the series resonance circuit; and f) measuring the frequency of the oscillation resulting in the series resonance circuit at a second frequency.

Figure 3:
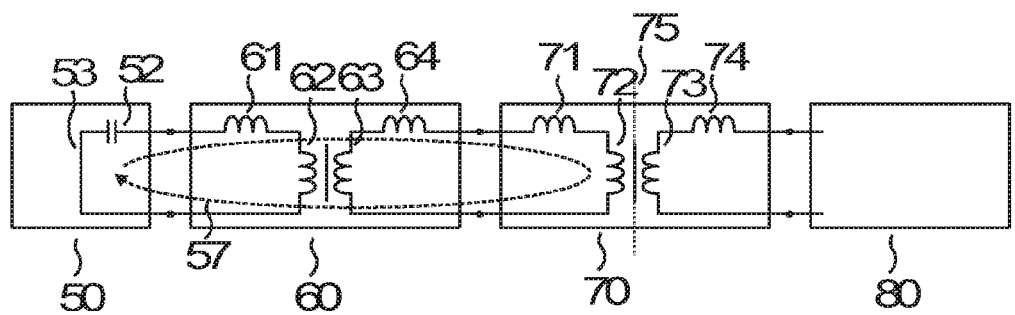
FIG. 3 shows the path of current in the circuit during the second measurement operation.

In this second section the power generator generates a longer sequence having several pulses of a direct-current voltage, or several periods of an alternating-current voltage. This longer sequence causes a definite amount of energy to be passed to the secondary side on which a suitable charging capacitor, located to follow a rectifier circuit, is charged. The charging capacitor is preferably charged at a voltage less than the rated voltage, so that the circuit is not yet activated at the load that may be, for example, an X-ray source. Following this in turn, the series resonance circuit is short-circuited. In the next step a second resonance frequency is measured. This second resonance frequency is now determined by other components than is the first resonance frequency. The charging of the charging capacitor now causes the rectifier diodes to be polarized in the non-conducting direction as long as the series resonance circuit has an only small oscillation amplitude. Thereby the current circuit with the load is decoupled from the remainder of the circuit. Thus, as illustrated in FIG. 3, the secondary side of the inductive power transmission device does not contribute to the series resonance. This is determined exclusively by the first series inductance and the first parallel inductance of the rotating transmission device and, as the case may be, by the first series inductance and the first parallel inductance of the matching transformer. As basically the first parallel inductance of the primary winding of the rotating transmission device is substantially larger than the second series inductance, the sum of the first series inductance and the first parallel inductance of the rotating transmission device now results in a substantially larger inductance than the sum, in the first section, of the first series inductance and the second series inductance of the rotating transmission device. Consequently, the second resonance frequency is distinctly lower than the first resonance frequency. The inductances of the inductive rotating transmission device are very strongly dependent upon the air-gap of the rotating transmission device and vary considerably already with relatively small air-gap tolerances.

In FIG. 3 the path of current in the second measurement operation of an embodiment is shown. In preparation of the measurement, a pulse sequence of defined length is generated with the power switch 51 and fed into the resonance circuit of the rotating transmission device. Thereby the charging capacitor 82 is given a certain charge, and therewith a definite voltage. In a second step the output of the power switch 51 is again short-circuited by means of a short-circuit 53. Here also the circuit oscillates at an natural frequency. As the charging capacitor 82 has been charged to a predetermined voltage by the preceding package of pulses, the rectifier 81 is set into a conducting state only when the maximum amplitude of the voltage at the anode of a rectifier diode exceeds the voltage at the cathode. When a measurement voltage in the resonance circuit is smaller than the voltage at the charging capacitor 82, one or more rectifier diodes of the rectifier 81 permanently remain in a non-conducting state. Thus, a resonance current no longer flows from the secondary winding of the inductive rotating transmission device and the inductance 74 through the output-side circuit. Now the resonance frequency with the resonance capacitor 52 is determined by the inductances 61, 64, 71, and particularly by the relatively high inductance of the primary winding of the rotating transmission device 72. Because normally this inductance is substantially larger than the inductance 74, a significantly lower resonance frequency results here, as is shown in FIG. 4. From this resonance frequency conclusions now may be drawn concerning the first parallel inductance 72 of the primary winding of the rotating transmission device.

FIG. 4 shows the path of the output current 54 of the power generator during the first measurement operation as a function of time in an example of an arrangement. Here the lower horizontal axis indicates the time in microseconds, and is scaled from 0 microseconds on the left-hand side to 1000 microseconds on the right-hand side. The vertical axis indicates the current with a scaling of −50 amperes on the lower side to +50 amperes on the upper side of the diagram. Here the damped oscillation is very well discernable. Here also no aperiodic damping caused by an ohmic load can be seen. Rather than this, the current decreases linearly with the number of periods, which indicates that at each period of the oscillation a constant amount of energy is taken from the oscillatory circuit. The charging capacitor 82 is charged stepwise with this amount of energy.

Figure 5:
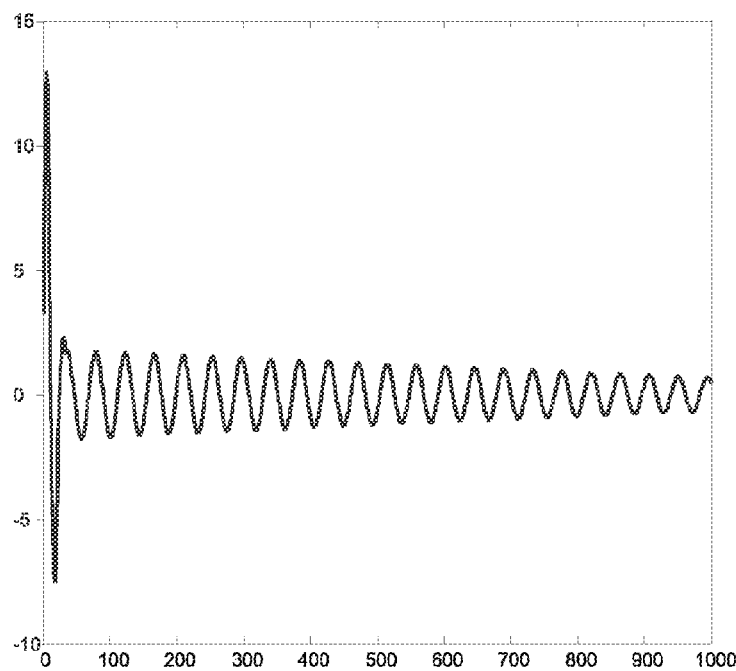
FIG. 5 shows the temporal path of the output current of the power generator during the second measurement operation.

FIG. 5 shows the path of the output current 54 of the power generator during the second measurement. As in FIG. 4, here too the time from 0 to 1000 microseconds is indicated on the horizontal axis. On the vertical axis the current through the resonance circuit is indicated, scaled from −10 amperes at the lower end to +15 amperes at the upper end. Here an oscillation that has a substantially lower frequency than is the case with the previously measured first curve results.

The third section has this step: g) determining a control parameter for controlling the power generator by calculation, estimation, or with the aid of a table of values, from the frequencies measured in the steps c and f.

Now in this third section the determination of at least one value of a control parameter for controlling the primary side is performed, by which the output voltage can be set. This can be performed by calculation, estimation, or reading-out a table of values. Preferably the operating frequency of the power generator is determined as a control parameter. Alternatively or additionally, also an input voltage for the power generator (an intermediate circuit voltage) can be set, such as is generated for example by an upstream converter or a power factor correction circuit. Basically, also a correction parameter for an internal correcting variable of a regulating circuit can be used instead of the control parameter. Thus, in particular for example, a predetermined value for a generator frequency or an output voltage can be corrected with the correction parameter.

As now two different measurements have been performed with different frequencies in the first and second sections, in which different components of the power transmission device were involved, the inductance of the primary side of the power transmission device and/or also the stray inductance of the power transmission device now can be calculated, in case the remaining values for the components, such as for example the capacitance of the resonance capacitor and, as the case may be, the inductances of the matching transformer, are either known or defined as constant values. With this inductance it is now possible to find an optimum operating point or an optimum operating frequency of the power generator for transmission of a given power or for attainment of a well-founded output voltage or an output current on the output side.

Figure 6:
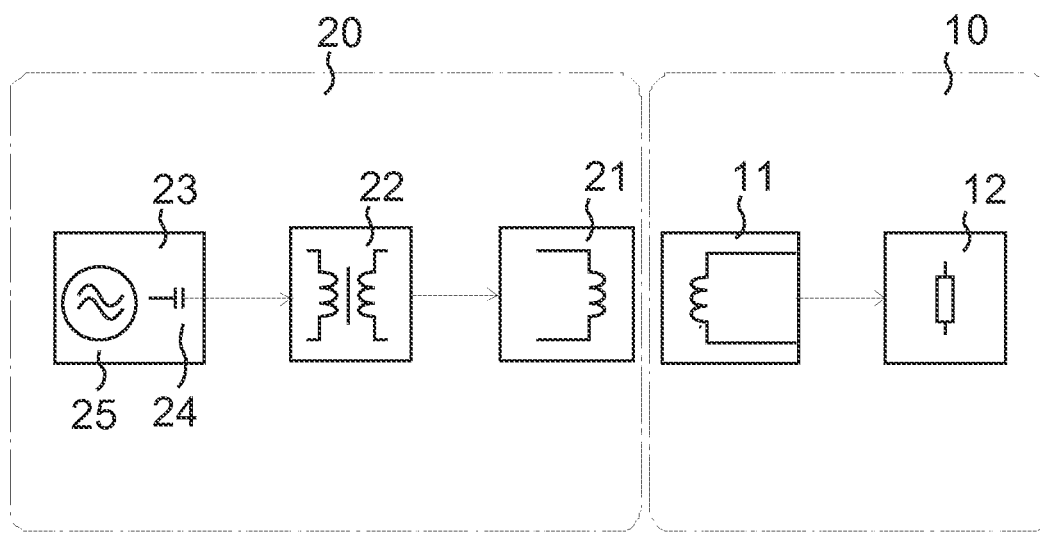
FIG. 6 schematically shows the design of an inductive power transmission device.

FIG. 6 schematically shows the design of an inductive power transmission device of an embodiment, which is preferably designed as a rotary transmission device. This power transmission device has a primary side 20 usually mounted to be stationary, and a secondary side 10 usually mounted to be movable or rotating. Of course, also the primary side and the secondary side may be interchanged, so that energy can be transmitted from the movable side to the fixed or stationary side. On the here movable secondary side is a secondary winding of the inductive power transmission device, which passes its energy to a load 12. This load may be, for example, the X-ray tube of a computer tomograph. The primary side includes a primary side 21 of the power transmission device, which is fed from a power generator 23 via a matching transformer 22. The power generator 23 has an inverter 25 and also a resonance capacitor 24. Instead of the resonance capacitor at the output of the inverter, also one or a plurality of capacitors in series with a desired inductance could be disposed in the circuit.

Figure 7:
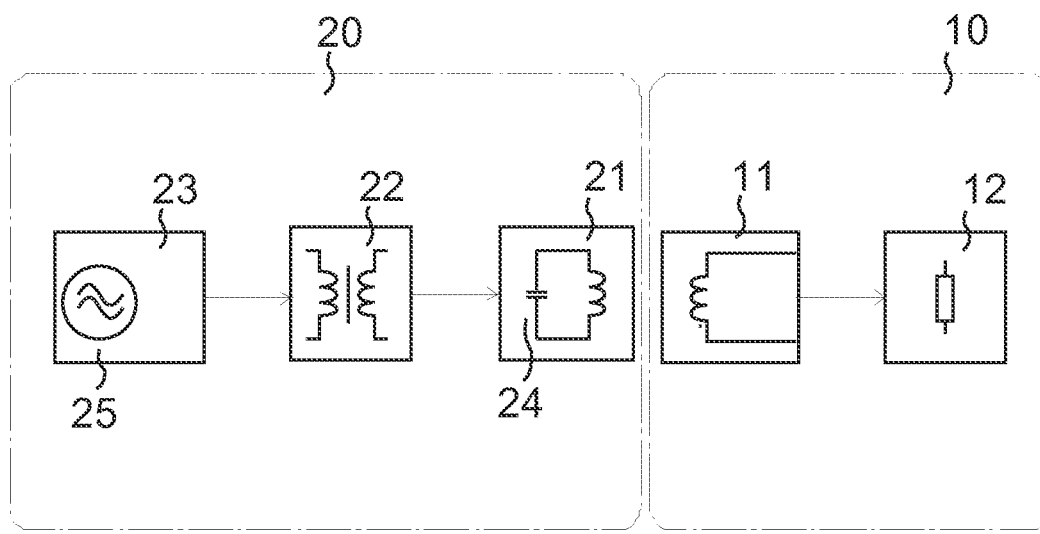
FIG. 7 schematically shows the design of another power transmission device in accordance with the invention.

FIG. 7 schematically shows the design of another embodiment of a power transmission device, which is adapted for parallel resonance operation. By way of example, the resonance capacitor 24 is here connected to be parallel to the primary side 21 of the power transmission device. Basically, a resonance capacitor for generating parallel resonances could be connected in parallel also to any other inductance. A plurality of resonance capacitors also could be provided. For a combined operation with series or parallel resonances, also at least one other resonance capacitor could be connected in series, as shown for example in the preceding Figure.

Figure 8:
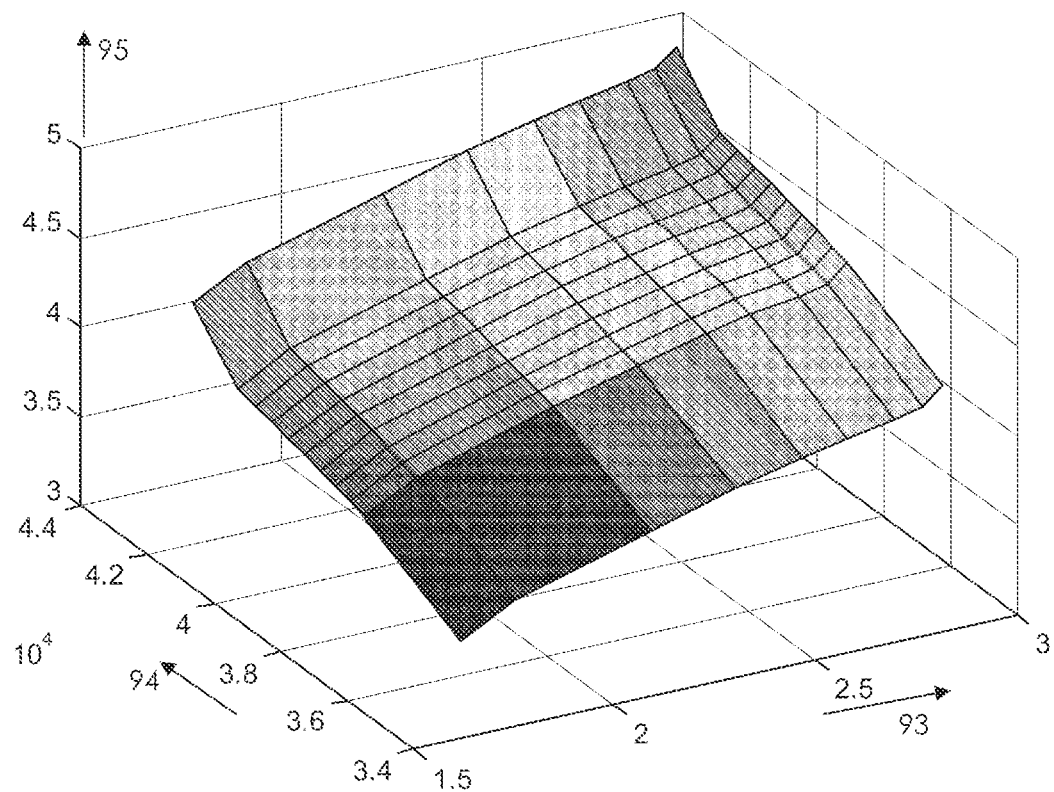
FIG. 8 shows an example of a 3-dimensional curve family with which the correct value for the correcting variable (which here is the switching frequency) is determined from the two measurements.

In order to generate the table of values or a formula for calculating the control parameter, a multi-dimensional table of values, such as shown in FIG. 8 for example, can be recorded for reference during a calibration phase. This is effected by intentional variation of parameters such as, for example, the air-gap and resonance capacitance with which resonance frequencies for both measurements are set. By adjusting the air-gap, the resonance frequency obtained for the measurement according to section 2 is varied, and by varying the resonance capacitance or stray inductance, the resonance frequency obtained for the measurement according to section 1 is varied. For each measured frequency pair, the value for the control parameter is determined—in FIG. 8 this is, for example, the switching frequency of the inverted rectifier—which value is needed for setting the output voltage to the desired value. This multidimensional family of characteristics is recorded, for example, in the memory of the controller or regulating controller which may be a part of the power generator. After both measurements have been performed in the series instrument, and the two frequency measurements are available, it is possible, for example from interpolation, to determine a suitable value for the control parameter for any measured frequency pair. Alternatively, instead of the curve family, also a formula describing the functional relationship between the control parameter and the two resonance frequencies can be recorded and used for determining a suitable value for the control parameter.

The described method can now be applied for various positions between the movable parts of the power transmission device, in particular for different angular positions of the rotating transmission device. Thus, in the case of a rotating transmission device it is possible to determine a function of the inductance, or the optimum operating frequency, in dependence upon the angular position. In an advantageous manner, during initial operation of a computer tomograph an initializing or measuring sequence is performed, in which the method is performed in dependence upon angular position for at least one revolution of the rotating part of the gantry of the computer tomograph.

For verification of a measurement, or for increasing the accuracy of the measurement, advantageously a plurality of measurements can be performed successively. Each of the measured frequencies can be checked for plausibility. Thus, erroneous measurements can be screened-out. The precision of an overall measurement can be increased by determination of the arithmetic mean value.

In FIG. 8 is shown by way of example a 3D curve family with which the correct value for the correcting variable (here the switching frequency) is determined from the two resonance frequency measurements. The curve family is measured once on a reference system by intentional variation of the inductances and capacitances. For example, it may be stored in a permanent memory such as a flash memory of a DSP or microcontroller. If values for the resonance frequency, as measured with a series instrument, lie between two established points, then suitable interpolation is performed in order to achieve as small as possible an error. The axis 94 (pulse frequency) shows the frequency measured in the first section in a range of 34 to 44 kilohertz. The axis 93 (oscillation frequency) shows the frequency measured in the second section in a range of 15 to 30 kilohertz. The axis 95 (set frequency) shows the output parameter, here for example the generator frequency in a range of 30 to 50 kilohertz.

Figure 9:
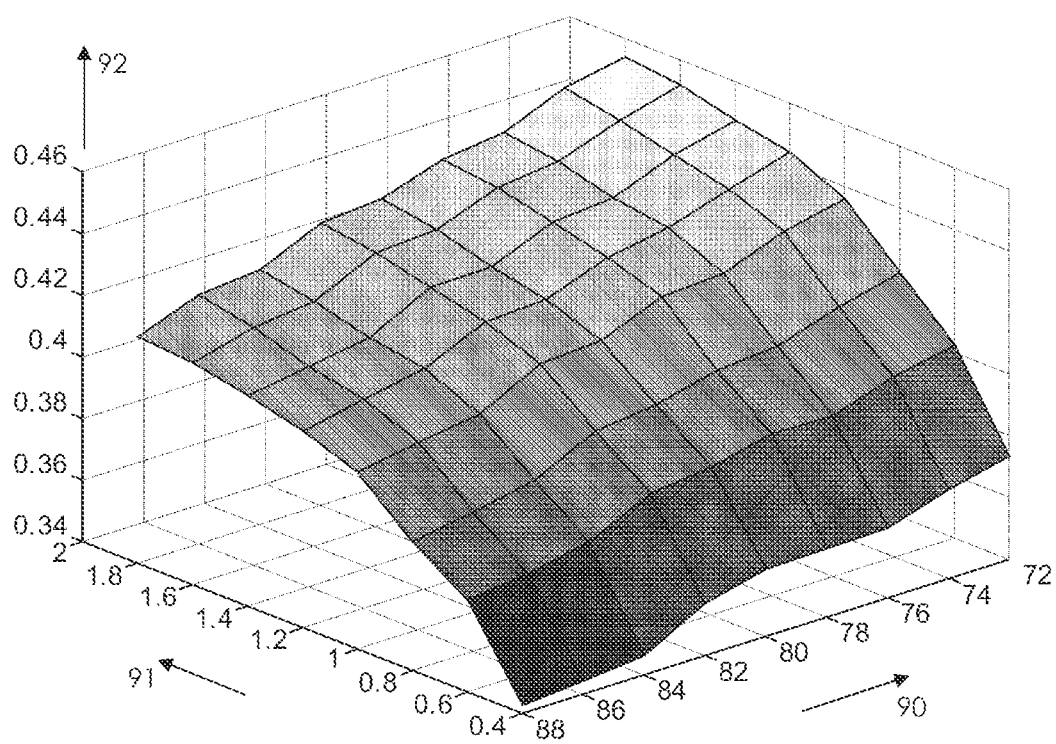
FIG. 9 shows as an example a 3D curve family that illustrates the relationship between the air-gap width, the resonance capacitance, and the first frequency determined from this.

In FIG. 9 is shown as an example a 3D curve family that illustrates the relationship between the air-gap width 91, the resonance capacitance 90, and the first frequency 92 determined from this. The axis 91 shows the width of the air-gap in a range of 0.4 mm to 2.0 mm. The axis 90 shows the resonance capacity in a range of 72 to 88 nanofarad. The axis 92 shows the first frequency measured in the first section in a range of 34 to 46 kilohertz.

Figure 10:
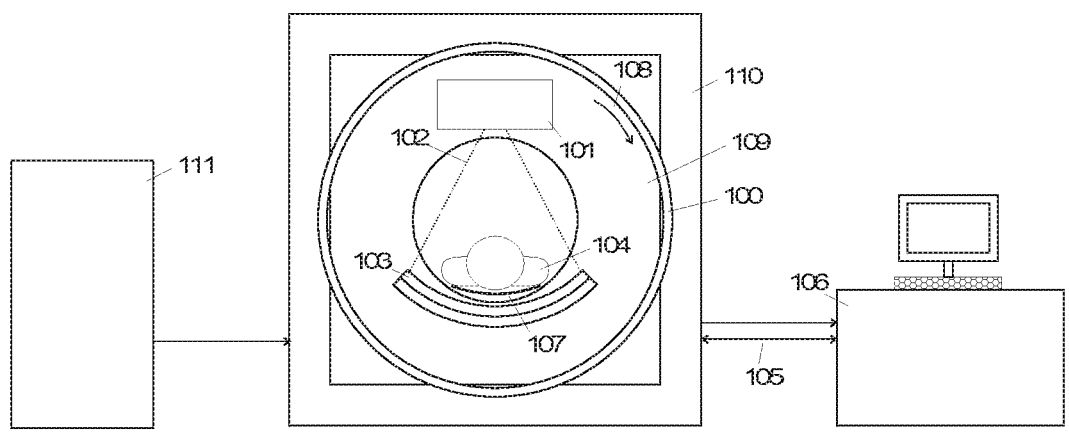
FIG. 10 schematically shows a computer tomograph.

In FIG. 10 is also schematically shown the design of a computer tomograph having an inductive rotating transmission device. The stationary part of the rotating transmission device is suspended within a heavy frame 110. The rotating part of the gantry 109 is rotationally supported with respect to this and rotates in the rotation direction 108. Here is located an X-ray tube 101 for generating an X-ray beam 102 which radiates through a patient 104 lying on a table 107 and is intercepted by a detector 103 and converted to electrical signals. For transmission of the electrical energy from an energy supply unit 111, an inductive power transmission line 100 is provided together with inductive couplers and an inductive rotating transmission device. Here the primary side is disposed on the stationary part, and the secondary side on the rotating part. The data detected by the detector 103 are transmitted to an evaluation unit 106. A control bus 105 serves for this, with which also the gantry itself can be controlled from the evaluation unit.

It will be appreciated to those skilled in the art having the benefit of this disclosure that this invention is believed to provide rotary joints and methods for transmission of power. Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A method for compensating tolerances of electrical components of an inductive coupler, comprising:
   generating a first sequence of at least one pulse of a direct-current voltage or at least one period of an alternating-current voltage into a resonance circuit of the inductive coupler;
   short-circuiting the resonance circuit subsequent to generating the first sequence to cause the resonance circuit to oscillate at a first resonance frequency;
   measuring the first resonance frequency;
   generating a second sequence having a plurality of pulses of a direct-current voltage or a plurality of periods of an alternating-current voltage so that a given voltage is built-up on a charging capacitor of the inductive coupler;
   short-circuiting the resonance circuit subsequent to generating the second sequence to cause the resonance circuit to oscillate at a second resonance frequency;
   measuring the second resonance frequency; and
   determining, from the measured first and second resonance frequencies, at least one value of a parameter which affects operation of a power generator of the inductive coupler.

2. The method according to claim 1, wherein the inductive coupler is an inductive rotating transmission device.

3. The method according to claim 1, wherein the step of measuring the first resonance frequency is performed prior to the step of measuring the second resonance frequency.

4. The method according to claim 1, wherein the step of measuring the second resonance frequency is performed prior to the step of measuring the first resonance frequency.

5. The method according to claim 1, wherein the step of determining at least one value of a parameter which affects operation of a power generator comprises calculating or estimating the at least one value based on the measured first and second resonance frequencies.

6. The method according to claim 1, wherein the step of determining at least one value of a parameter which affects operation of a power generator comprises determining the at least one value with aid of a table of values associated with the measured first and second resonance frequencies.

7. The method according to claim 6, further comprising generating the table of values while calibrating the inductive coupler and storing the table of value in a permanent memory of the inductive coupler.

8. The method according to claim 1, wherein the first sequence is shorter than the second sequence.

9. The method according to claim 1, wherein resonance circuit is a series resonance circuit.

10. The method according to claim 1, wherein the parameter is a control parameter of the power generator.

11. The method according to claim 1, wherein the parameter is a correction parameter for operating the power generator.

12. The method according to claim 1, wherein the method is performed during brief operating pauses of X-ray radiation.

13. The method according to claim 1, wherein an error signal is issued when the first resonance frequency and/or second resonance frequency lie outside given ranges of values.

14. An inductive coupler, comprising:
   a power generator for generating a pulsed direct-current voltage or an alternating-current voltage;
   an inductive power transmission device comprising a primary side and a secondary side which are moveable relative to each other, wherein the primary side has at least one primary winding, and wherein the secondary side has at least one secondary winding;
   a resonance capacitor arranged relative to the primary winding to form a series resonance circuit and/or a parallel resonance circuit;
   a charging capacitor arranged relative to the secondary winding to form a rectifier current; and
   a control means for:
      generating a first sequence of at least one pulse of a direct-current voltage or at least one period of an alternating-current voltage into the series resonance circuit and/or a parallel resonance circuit;
      short-circuiting the series resonance circuit and/or a parallel resonance circuit subsequent to generating the first sequence to cause the series resonance circuit and/or a parallel resonance circuit to oscillate at a first resonance frequency;
      measuring the first resonance frequency;
      generating a second sequence having a plurality of pulses of a direct-current voltage or a plurality of periods of an alternating-current voltage so that a given voltage is built-up on the charging capacitor;
      short-circuiting the series resonance circuit and/or a parallel resonance circuit subsequent to generating the second sequence to cause the series resonance circuit and/or a parallel resonance circuit to oscillate at a second resonance frequency;
      measuring the second resonance frequency; and
      determining, from the measured first and second resonance frequencies, at least one value of a parameter which affects operation of the power generator.

15. The inductive coupler according to claim 14, wherein the inductive coupler is an inductive rotating transmission device.

16. The inductive coupler according to claim 14, further comprising a matching transformer between the power generator and the inductive power transmission device.

17. The inductive coupler according to claim 14, further comprising component parts of soft magnetic materials.

18. A computer tomograph, comprising:
   an inductive coupler comprising:
      a power generator for generating a pulsed direct-current voltage or an alternating-current voltage;
      an inductive power transmission device comprising a primary side and a secondary side which are moveable relative to each other, wherein the primary side has at least one primary winding, and wherein the secondary side has at least one secondary winding;

a resonance capacitor arranged relative to the primary winding to form a series resonance circuit and/or a parallel resonance circuit; and a charging capacitor arranged relative to the secondary winding to form a rectifier current; and a control means for:

generating a first sequence of at least one pulse of a direct-current voltage or at least one period of an alternating-current voltage into the series resonance circuit and/or a parallel resonance circuit;

short-circuiting the series resonance circuit and/or a parallel resonance circuit subsequent to generating the first sequence to cause the series resonance circuit and/or a parallel resonance circuit to oscillate at a first resonance frequency;

measuring the first resonance frequency;

generating a second sequence having a plurality of pulses of a direct-current voltage or a plurality of periods of an alternating-current voltage so that a given voltage is built-up on the charging capacitor;

short-circuiting the series resonance circuit and/or a parallel resonance circuit subsequent to generating the second sequence to cause the series resonance circuit and/or a parallel resonance circuit to oscillate at a second resonance frequency;

measuring the second resonance frequency; and determining, from the measured first and second resonance frequencies, at least one value of a parameter which affects operation of the power generator.

19. The computer tomograph according to claim 18, wherein the inductive coupler is an inductive rotating transmission device.

20. The computer tomograph according to claim 18, wherein the inductive coupler further comprises a matching transformer between the power generator and the inductive power transmission device.

* * * * *